Nov. 16, 1965 N. LAING 3,218,437
ELECTRICAL HEATER ELEMENTS
Filed Sept. 8, 1961 4 Sheets-Sheet 1

INVENTOR
Nikolaus Laing
By Watson, Cole, Grindle & Watson
ATTORNEYS

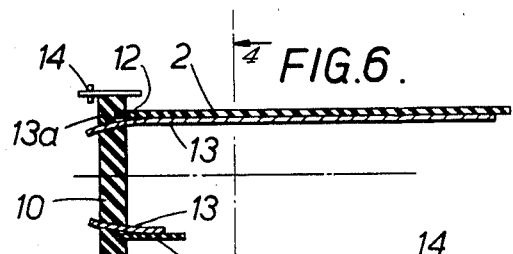
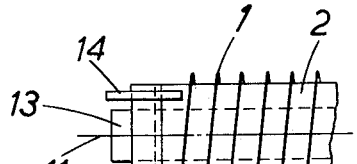
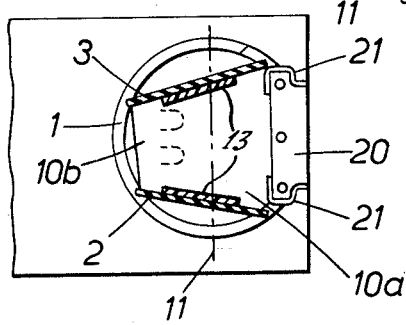
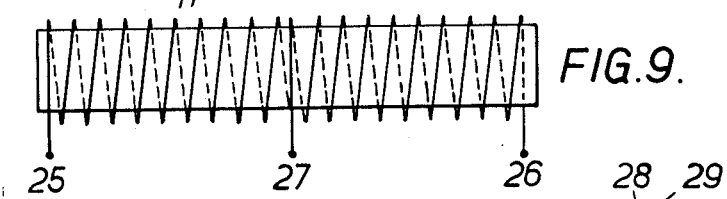
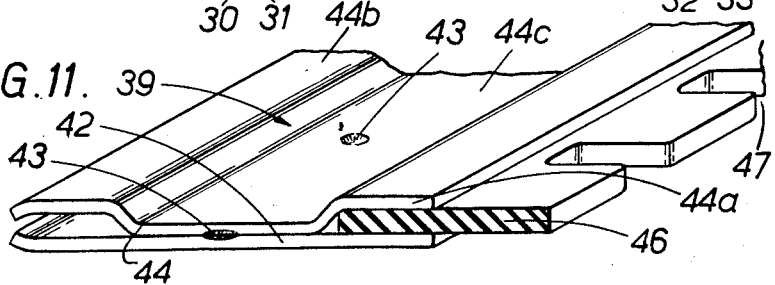

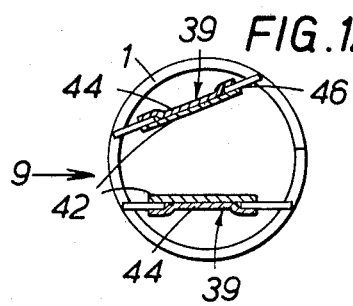
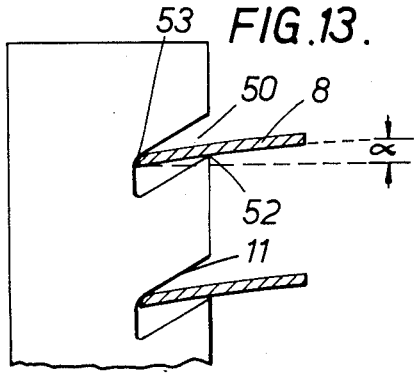
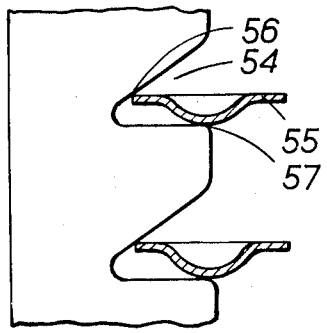
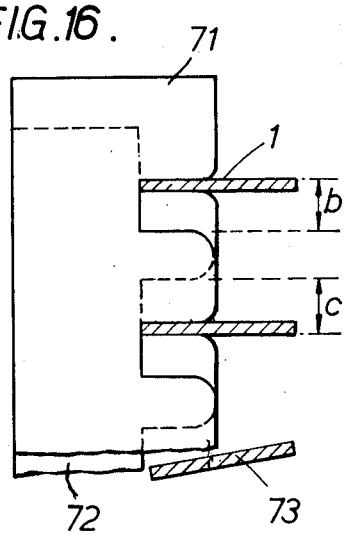
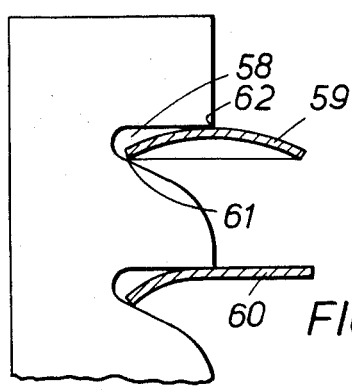

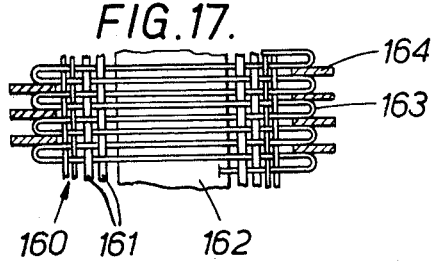
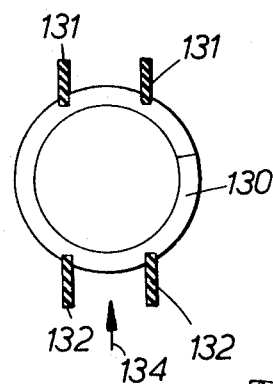
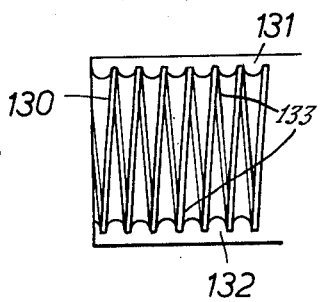
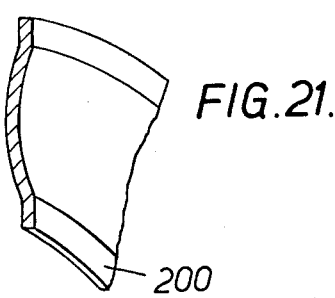

United States Patent Office 3,218,437
Patented Nov. 16, 1965

3,218,437
ELECTRICAL HEATER ELEMENTS
Nikolaus Laing, Stuttgart, Germany, assignor, by mesne assignments, to Laing Vortex, Inc., New York, N.Y.
Filed Sept. 8, 1961, Ser. No. 137,485
Claims priority, application Germany, Sept. 8, 1960, L 36,998; Oct. 24, 1960, L 37,344; May 13, 1961, L 38,966
10 Claims. (Cl. 219—546)

This invention relates to electric heater elements, more especially (though not exclusively) for use with fans of the cross-flow kind, that is, fans comprising a cylindrical bladed rotor and means co-operating with the rotor on rotation thereof to induce a flow of air twice through the blades of the rotor in a direction transverse to the axis thereof.

The invention provides an electric heater element for use with a cross flow fan comprising a resistor strip wound edgewise into a helical configuration and supported upon a plurality of carrier members running longitudinally of the helix and presenting thereto narrow insulating edge portions which locate the convolutions of the helix, the carrier members being spaced apart to provide a passage for air flow between them transverse to the axis of the helix.

A preferred form of heater element according to the invention comprises a resistor strip wound edgewise into a helical configuration and supported upon a pair of strip-like carrier members running longitudinally of the helix and within it, each carrier member presenting to the helix a pair of narrow insulating edge portions which locate the convolutions thereof, and the carrier members being spaced apart to define between them a passage for air flow transverse to the axis of the helix.

Important subsidiary features of the invention relate to the carrier members and their mounting, and the mounting of the resistor strip on the carrier members, as will be pointed out below.

The electric heater element according to the invention is particularly suitable for incorporation in a fan-heater unit including a cross-flow fan as above defined, the rotor and the helix having substantially the same length and extending parallel to one another, the fan discharging transversely through the helix: the invention includes such a fan-heater unit.

In a modification of the invention the resistor strip is toroidal: this modification lends itself to combination with an axial-flow fan, the axis of the fan coinciding in such combination with that of the toroid, and the invention includes also the fan-heater unit thus formed.

Various embodiments of the invention will now be described by way of example with reference to the accompanying diagrammatic drawings, in which:

FIGURE 6 is a partial longitudinal section of the arrangement shown in FIGURE 1;

FIGURE 7 is a partial longitudinal section of the arrangement shown in FIGURE 1, the section being taken in an axial plane perpendicular to that of the section in FIGURE 6;

FIGURE 8 is a cross section of a spacing member and of the support means for the resistor strip, taken on the line A—A in FIGURE 6;

FIGURE 9 is a schematic plan view of a heater element;

FIGURE 10 is a schematic plan view of a further form of heater element;

FIGURE 11 is a partial perspective view of a carrier member for a heater element, the member being shown broken away and sectioned;

FIGURE 12 is a transverse section of a heater element incorporating carrier elements as shown in FIGURE 11;

FIGURES 13, 14, 15 and 16, are partial longitudinal sections of heater elements, showing four ways of locating resistor strips on insulating edge portions of carrier members;

FIGURES 17 and 18 are respectively a partial longitudinal section of yet another heating element and a cross section of one carrier member thereof;

FIGURES 19 and 20 are respectively a transverse section and a partial longitudinal section of a further form of heating element, and FIGURE 21 is a partial perspective view of a resistor strip shown broken away and sectioned.

Figure 1:
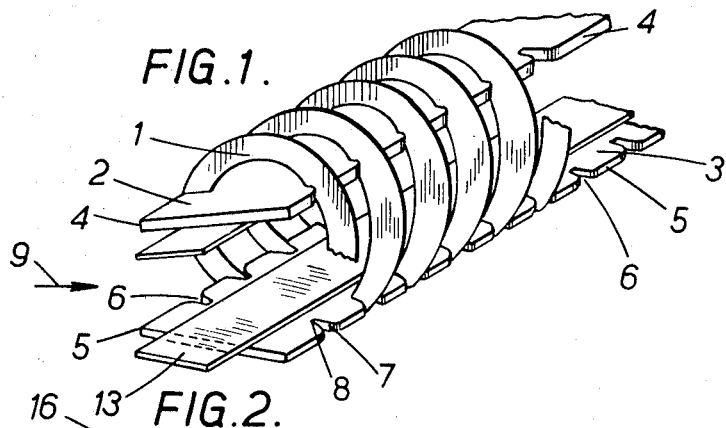
FIGURE 1 is a perspective view of a first form of electric heater element the element being shown partly broken away.

Referring to the drawing, the electric heater element shown in FIGURE 1 comprises a flat resistor strip 1 wound edgewise into a helical configuration and supported on a pair of carrier members in the form of thin insulating strips 2, 3 running longitudinally of the helix and within it. The insulating strips 2, 3 present four narrow edge portions 4, 5 to the helix which are notched at 6 to locate the convolutions of the helix, each notch 6 having a rounded open mouth 7 leading to an inner portion 8 in which the strip 1 fits fairly snugly. The insulating strips 2, 3 lie at a slight angle to a medial plane containing the axis, and provide a diverging passage or duct for air flowing towards the helix in a direction perpendicular to its axis and along the medial plane: this direction is indicated by the arrow 9. The cross-section which the passage presents to flow is large in relation to the area of the helix projected on to an axial plane transverse to flow. Because the passage diverges it acts as a diffuser: because the resistor strip 1 presents it edges to flow through the passage it can have a comparatively large surface area while affording little resistance to air flow.

As illustrated in FIGURES 6 and 7 the insulating strips 2, 3 are supported in end members 10 in the form of insulating blocks split on a plane running axially of the helix and indicated at 11. Slots 12 in the members 10 running across plane 11 receive the ends of the strips 2, 3. Resilient supporting members 13 each of which extend through an oblique slit 13a in the end members 10 lie against the sides of the strips 2, 3 which face one another and are resiliently stressed to urge the strips apart against the helix; this causes the strips 2, 3 to engage the helix firmly even after expansion thereof on heating. The members 13 may be spring steel strips, and the angle of the slits chosen to give the required configuration and stress to those strips. The arrangement is such as to cause minimum resistance to flow through the air passage between strips 2, 3. Terminal members 14 for the resistor strip 1 are mounted on the end members 10.

The electric heater element so far described is advantageously incorporated in a fan-heater unit including a cross flow fan as above described.

Figure 2:
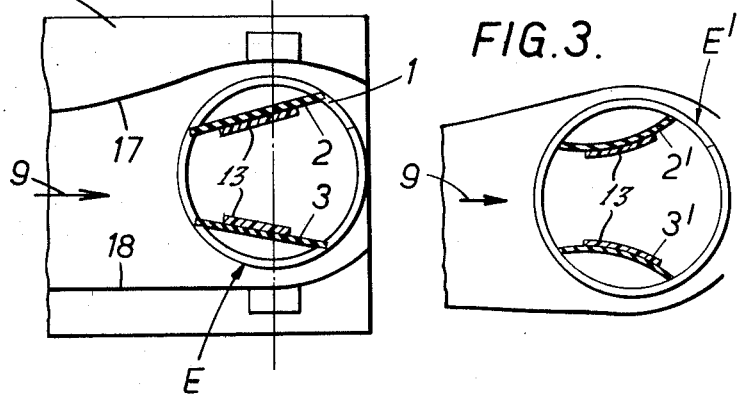
FIGURE 2 is a partial cross section of a fan heater unit equipped with an element constructed as shown in FIGURE 1.

FIGURE 2 shows a portion of such a unit, the rotor and guide means, which have substantially the same length as the element here designated generally E. The element is located in a duct formed by opposite end walls 16 and opposite side walls 17, 18, air being discharged into the duct directly from the rotor. The greater part of the air flowing in the duct passes through the passage between the strips 2, 3 but a minor quantity flows to the outside of those strips.

Figure 3:
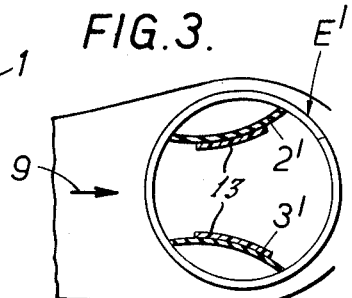
FIGURE 3 shows another fan heater unit represented in the same manner as that of FIGURE 2.

FIGURE 3 shows a modification of the arrangement illustrated in FIGURE 2: the electric heater element, here designated E' is similar to the element E previously described except that the flat strips 2, 3 of FIGURES 1 and 2 are replaced by strips 2', 3' which are arcuate in section transverse of the helix and convex towards one another. Once again a generally diverging air passage is provided which forms a diffuser.

FIGURE 8 shows the method of supporting the end members 10: one part 10a of each end member (which, it will be recalled is split on the plane 11) carries an extension 20 on the side opposite the other part 10b. The extension 20 is embraced at opposite ends by lugs 21 integral with and bent out from the adjacent end wall 16, which are made of sheet metal.

Figure 4:
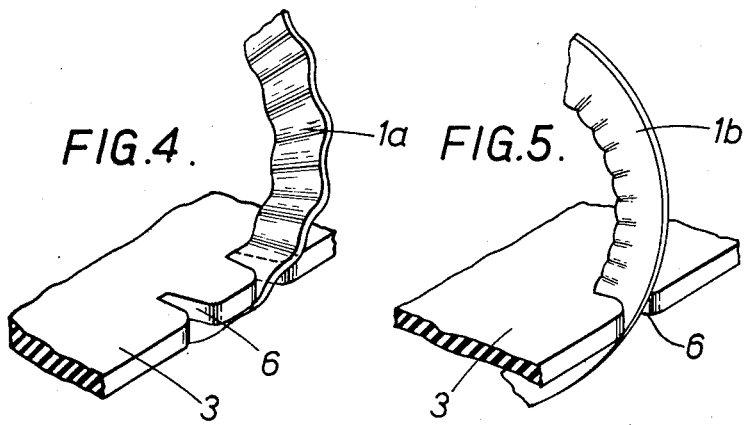
FIGURES 4 and 5 are fragmentary perspective views of two further forms of electric heater elements in which the resistor strip is corrugated across its width.
Figure 5:
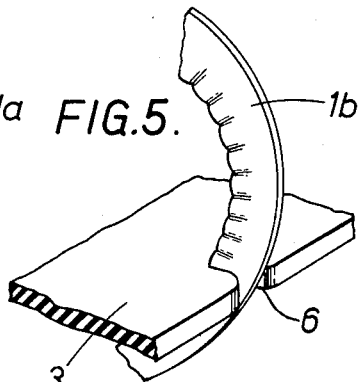

FIGURES 4 and 5 show two modifications of the heater element of FIGURE 1 in which the resistor strips, designated 1a in FIGURE 4 and 1b in FIGURE 5 are corrugated across their width, the corrugation in FIGURE 4 extending the whole way across the strip the depth of the corrugation being greater at their inner edges, and those in FIGURE 5 being on the inner edge only and having a short pitch. In the FIGURE 5 arrangement the notches 6 can be wider than the thickness of the strip 1b, the strip nevertheless wedging in the slot by virtue of its being corrugated.

FIGURES 9 and 10 show two heater elements. The FIGURE 9 element has two end connections 25, 26 and is centre-tapped at 27. The FIGURE 10 element includes two resistor strips 28, 29 wound as a double-start helix, and providing connections 30, 31 and 32, 33. In both cases the connection can be switched to give half or full heat by connection in series or in parallel of parts of the element as will be apparent to those skilled in the art.

A further form of carrier member designated generally 39 is shown in FIGURES 11 and 12, and comprises two resilient sheet metal strips 42, 44 of equal width, the strip 44 having its edge portions 44a, 44b offset with respect to its central portion 44c, and its central portion 44c secured to the strip 42 at intervals along its length by means of spot-welds 43. Each of the edge portions 44a, 44b clamps an insulator strip 46 frictionally against the metal strip 42. Only one insulator strip 46 is shown to the right of the figure, the other side of the figure illustrating the unstressed condition of strips 42, 44: by comparison of one side of the figure with the other it will be seen that the strips 42, 44 are strongly stressed adjacent their edges in the assembled condition of the metal and insulator strips and thus exert a powerful frictional force.

The insulator strips 46 are notched at their edges as shown at 47 to carry the resistor strip 1. A heater element comprising two carrier members 39 and a resistor strip 1 is shown in FIGURE 12: apart from the construction of the carrier members the arrangement is similar to what is shown in FIGURES 1 and 2.

Instead of locating the resistor strip with respect to the insulating edge portions by notches which have the same width as the thickness of the strip, the notches can be wider and the resistor strip can be made to engage each notch so as, seen in section taken axially of the helix, to make contact with the sides of the notch at two points, whereby stress in the resistor strip along its length sets up a corresponding stress in the resistor strip in the plane of said section which latter stress tends to lock the trip to the insulating edge portions.

FIGURES 13 to 16 show various ways in which this can be done. The parallel-sided notches 50 in the resistor strip of FIGURE 13 are some three of four times wider than the thickness of the strip—this width is not critical—and oblique to the length of the strip. When the flat resistor strip 1 is wound on to the carrier members under tension it takes up a position at a slight angle shown as and to the position it would have adopted in a notch running in a plane perpendicular to the axis of the helix, by reason of opposite sides of the strip contacting the sides of the notch at points 52, 53 which are spaced in the direction of the width of the strip. The strip is stressed in the plane of the cross-section shown in FIGURE 13, and, though initially straight in cross section becomes on assembly with the carrier members somewhat arcuate as seen in cross-section.

The resistor strips of FIGURES 14 and 15 are not flat initially. In FIGURE 14 the strip shown at 55 is gutter-shaped, having flat coplanar edge portions and an arcuate central portion: in FIGURE 15 two slightly different forms of strip 59, 60 are shown, the strip 59 being continuously and uninflectedly arcuate and the strip 60 being arcuate over its inner edge but flat over its outer edge. Each form of strip 55, 59, 60 is received in V-shaped notches designated 54 in FIGURE 14 and 58 in FIGURE 15, these notches both having one side perpendicular to, and the other side oblique to, the longitudinal edge of the insulating strip in which they are formed: the notches 54, 58 differ only in that the oblique edges of the notches 58 are rounded more generously into the longitudinal of the strip edge. The resistor strips 55, 59, 60 are wound into the notches under tension and contact the sides of the notches at two points designated 56, 57 in FIGURE 14 and 61, 62 in FIGURE 15, these points being spaced in the width of the strip so that the strip is stressed over its cross-section.

The FIGURE 16 arrangement provides two insulator strips 71, 72 overlying one another and each formed with notches several times wider than the thickness of the strip 1 to be accommodated. The notches in the strips 71, 72, and their width, are indicated at b, c: the width it may be the same as or different from the width c, though the pitch of the notches must be the same on either strip. The strips 71, 72 are displaced relatively endwise after the winding of the resistor strip to grip the latter firmly. If desired the notches can be modified to position the resistor strip obliquely as shown at 73 after the endwise displacement of the strips.

The arrangement of FIGURES 13 to 16 make it unnecessary to cut accurately dimensioned and narrow slots in order to prevent looseness (and consequent hum) in the helix. These arrangements also help to take up thermal expansions and contractions without buckling.

FIGURES 17 and 18 show a further form of carrier member consisting of a fabric of ceramic thread (e.g. glass or quartz fibre). This fabric comprises an edge area 160 of material resistant to high temperature, e.g. glass or quartz thread. This is adjoined by material 161 less resistant to temperature, e.g. glass "silk" or asbestos fibres. A metal carrier, preferably of spring steel strip, 162, and arcuate in cross-section, is centrally disposed, and embedded in the fabric. The threads extending transversely thereto have their ends cut of or formed into loops 163. One convolution of the resistor strip here designated 164 is positioned between each two adjoining loops.

FIGURES 19 and 20 show another way of supporting an edge wound helix of resistor strip here shown at 130. This helix has its convolutions engaging in notches 133 formed in four comb-like insulator strips 131, 132 situated outside the helix and presenting their edges to the intended direction of air flow through the helix as shown by the arrow 134, and defining between them a passage for this flow. The strips 131 can be angled to the median plane to provide a convergent passage, and the strips 132 a divergent passage.

FIGURE 21 shows a further form of resistor strip designated 200, having flat coplanor edge portions and a dished central portion. The strip can be given a taper of about 1° between opposite faces, the angle being meassured with the strip flat. This taper can be given to any of the strips herein described.

I claim:

1. In a cross-flow fan, an electric heating element comprising a resistor strip wound edgewise into a helix, a pair of spaced insulating carrier strips running lengthwise of and within the helix, each carrier strip presenting a pair of notched edges to the helix, the convolutions of the helix having substantially point contact with the four notched edges of the carrier strips and extending free between the points of contact with the carrier strips for air flow through the helix transverse to the axis thereof both between the carrier strips and to the side of each strip opposite the other strip, metallic support strips overlying the carrier strip on their adjacent faces to hold the carrier strips against the convolutions of the helix, the support strips being out of contact as to the helix, and end support members mounting the support strips at either end of the helix.

2. In a cross-flow fan, an electric heating element comprising a resistor strip wound edgewise into a helix, a pair of spaced plate-like carrier members running lengthwise of and within the helix, each carrier member presenting a pair of notched insulating edge portions to the helix, the convolutions of the helix having substantially point contact with the four notched edges of the carrier members and extending free between the points of contact with the carrier members for air flow through the helix transverse to the axis thereof both between the carrier members and to the side of each member opposite the other member, and end carrier members mounting the support strips at either end of the helix.

3. In a cross-flow fan according to claim 1, in which said support strips having portions extending through the end support members.

4. In a cross-flow fan according to claim 1, in which the notches in the carrier strips are wider than the thickness of the resistor strip and the resistor strip is bent out of its plane.

5. In a cross-flow fan, an electric heater element comprising a resistor strip wound edgewise into a helix, a pair of spaced insulator strips running lengthwise of the helix and within it, the insulator strips having notched edges and the convolutions of the helix being received in and located by said notches, a pair of resilient metallic support strips located within and substantially overlying the insulator strips and out of contact with the helix, end support members at either end of the helix with the end portions of said support strips extending through the end support members and biased thereby to apply outward pressure on the insulator strips to hold them against the convolutions of the helix.

6. In a cross-flow fan according to claim 5, in which the ends of the insulator strips are received and located in opposed slots in the end support members.

7. In a cross-flow fan according to claim 5, in which the end support members are each in two parts assembled around the metallic support strips.

8. In a cross-flow fan according to claim 2, in which each carrier member includes a pair of metallic support strips secured face to face with their edges clamping outwardly extending insulator strips each providing one of said insulating edge portions.

9. In a cross-flow fan according to claim 1, in which the notches in the carrier strips are oblique and wider than the thickness of the resistor strip, the resistor strip contacting one side of each notch adjacent its mouth and the other side of the notch inwardly of its mouth and being stressed to lie at a slight angle to the position it would occupy if the notch were not oblique.

10. In a cross-flow fan according to claim 2, in which each insulating edge portion is provided with a pair of insulator strips both of which are notched, the notches being wider than the thickness of the resistor strip, and each convolution of the helix being clamped between one side of a notch in one insulator strip and the opposing side of a corresponding notch in the other insulating strip.

References Cited by the Examiner

UNITED STATES PATENTS

| 886,682 | 5/1908 | Delany | 338—296 X |
| 1,315,791 | 9/1919 | Parsons | 338—278 X |
| 1,555,292 | 9/1925 | Keene | 338—296 X |
| 1,706,014 | 3/1929 | Whittingham | 338—296 X |
| 1,728,090 | 9/1929 | Whittingham | 338—296 X |
| 1,919,975 | 7/1933 | Chapman | 338—301 X |
| 2,081,090 | 5/1937 | Frese | 338—296 X |
| 2,390,790 | 12/1945 | Immel et al. | 338—278 X |
| 2,502,044 | 3/1950 | Issacson | 338—305 X |
| 2,560,690 | 7/1951 | Griffes et al. | 338—278 X |
| 2,583,906 | 1/1952 | Van Guilder | 165—30 |
| 2,598,592 | 5/1952 | Olson et al. | 338—305 |
| 2,795,765 | 6/1957 | Stroble | 174—138.8 X |

FOREIGN PATENTS 290,314  11/1931  Italy.

RICHARD M. WOOD, *Primary Examiner.*

MAX L. LEVY, *Examiner.*